(12) United States Patent
Rosen

(10) Patent No.: US 11,272,020 B2
(45) Date of Patent: Mar. 8, 2022

(54) SOCIAL NETWORK FOR MAPPING GRADATIONS TO TARGET INTENT

(75) Inventor: James S. Rosen, New York, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 977 days.

(21) Appl. No.: 13/186,753

(22) Filed: Jul. 20, 2011

(65) Prior Publication Data
US 2011/0282750 A1 Nov. 17, 2011

Related U.S. Application Data

(63) Continuation of application No. 11/253,848, filed on Oct. 18, 2005, now Pat. No. 8,019,692.

(60) Provisional application No. 60/620,456, filed on Oct. 19, 2004.

(51) Int. Cl.
| | |
|---|---|
| *G06Q 30/02* | (2012.01) |
| *G06Q 50/00* | (2012.01) |
| *H04L 67/50* | (2022.01) |
| *H04W 4/029* | (2018.01) |
| *H04W 4/21* | (2018.01) |
| *G06F 16/9537* | (2019.01) |

(52) U.S. Cl.
CPC .......... *H04L 67/22* (2013.01); *G06F 16/9537* (2019.01); *G06Q 30/02* (2013.01); *G06Q 30/0267* (2013.01); *G06Q 30/0269* (2013.01); *G06Q 50/01* (2013.01); *H04W 4/029* (2018.02); *H04W 4/21* (2018.02)

(58) Field of Classification Search
CPC .... H04L 67/22; G06Q 30/0269; G06Q 50/01; G06Q 30/02; H04W 4/21; G06F 16/9537
See application file for complete search history.

(56) References Cited

U.S. PATENT DOCUMENTS

| | | |
|---|---|---|
| 5,493,692 A | 2/1996 | Theimer et al. |
| 5,611,050 A | 3/1997 | Theimer et al. |
| 5,724,567 A | 3/1998 | Rose et al. |
| 5,754,939 A | 5/1998 | Herz |
| 5,774,357 A | 6/1998 | Hoffberg et al. |
| 5,893,075 A | 4/1999 | Plainfield et al. |
| 5,948,040 A | 9/1999 | Delorme et al. |

(Continued)

FOREIGN PATENT DOCUMENTS

| | | |
|---|---|---|
| EP | 1265151 | 12/2002 |
| GB | 2375921 | 11/2002 |

(Continued)

OTHER PUBLICATIONS

Schmandt C. "Everywhere Messaging" (1999), In: Gellersen HW. (eds) Handheld and Ubiquitous Computing. HUC 1999. Lecture Notes in Computer Science, vol. 1707. Springer, Berlin, Heidelberg, https://doi.org/10.1007/3-540-48157-5_3 (Year: 1999) (Year: 1999).*

(Continued)

*Primary Examiner* — Mehmet Yesildag

(57) ABSTRACT

Systems and methods for social networking. Location-related data and other behavioral and exogenously generated characteristics are used to replace or supplement self-generated profiles in order to enhance the quality and trustworthiness of the matches made using the system and facilitate the inputting of profile information.

15 Claims, 4 Drawing Sheets

(56) References Cited

U.S. PATENT DOCUMENTS

| | | |
|---|---|---|
| 5,963,951 A | 10/1999 | Collins |
| 6,091,956 A * | 7/2000 | Hollenberg ............ G06Q 30/02 455/456.5 |
| 6,112,181 A | 8/2000 | Shear et al. |
| 6,119,114 A | 9/2000 | Smadja |
| 6,134,532 A | 10/2000 | Lazarus et al. |
| 6,175,831 B1 | 1/2001 | Weinreich et al. |
| 6,269,369 B1 * | 7/2001 | Robertson ............ G06Q 10/02 |
| 6,317,718 B1 * | 11/2001 | Fano ................... G06Q 10/109 705/14.39 |
| 6,343,317 B1 | 1/2002 | Glorikian |
| 6,349,327 B1 | 2/2002 | Tang et al. |
| 6,421,669 B1 | 7/2002 | Gilmour et al. |
| 6,446,076 B1 | 9/2002 | Burkey et al. |
| 6,486,892 B1 | 11/2002 | Stern |
| 6,490,519 B1 | 12/2002 | Lapidot et al. |
| 6,539,232 B2 | 3/2003 | Hendrey et al. |
| 6,542,449 B2 | 4/2003 | Nakatsuka et al. |
| 6,542,748 B2 | 4/2003 | Hendrey et al. |
| 6,542,749 B2 | 4/2003 | Tanaka et al. |
| 6,542,750 B2 | 4/2003 | Hendrey et al. |
| 6,549,768 B1 | 4/2003 | Fraccaroli |
| 6,571,279 B1 * | 5/2003 | Herz ................... G06Q 30/02 709/217 |
| 6,587,835 B1 | 7/2003 | Treyz et al. |
| 6,618,593 B1 | 9/2003 | Drutman et al. |
| 6,647,257 B2 | 11/2003 | Owensby |
| 6,647,269 B2 | 11/2003 | Hendrey et al. |
| 6,647,384 B2 | 11/2003 | Gilmour |
| 6,690,918 B2 | 2/2004 | Evans et al. |
| 6,701,362 B1 | 3/2004 | Subramonian et al. |
| 6,741,188 B1 | 5/2004 | Miller et al. |
| 6,819,919 B1 | 11/2004 | Tanaka |
| 6,832,245 B1 | 12/2004 | Isaacs et al. |
| 6,834,195 B2 | 12/2004 | Brandenberg et al. |
| 6,839,680 B1 * | 1/2005 | Liu ................... G06Q 30/0204 705/7.33 |
| 6,845,370 B2 | 1/2005 | Burkey et al. |
| 6,848,542 B2 | 2/2005 | Gailey et al. |
| 6,944,447 B2 | 9/2005 | Portman et al. |
| 6,965,868 B1 | 11/2005 | Bednarek |
| 7,024,205 B2 | 4/2006 | Hose |
| 7,035,863 B2 | 4/2006 | Kurapati et al. |
| 7,043,497 B1 | 5/2006 | Carty et al. |
| 7,071,842 B1 | 7/2006 | Brady |
| 7,103,370 B1 | 9/2006 | Creemer |
| 7,109,859 B2 | 9/2006 | Peeters |
| 7,177,880 B2 | 2/2007 | Ruvolo et al. |
| 7,181,412 B1 | 2/2007 | Fulgoni et al. |
| 7,185,065 B1 | 2/2007 | Holtzman et al. |
| 7,197,470 B1 | 3/2007 | Arnett et al. |
| 7,200,592 B2 | 4/2007 | Goodwin et al. |
| 7,203,674 B2 | 4/2007 | Cohen |
| 7,224,957 B2 | 5/2007 | Spector |
| 7,243,105 B2 | 7/2007 | Thint et al. |
| 7,284,033 B2 | 10/2007 | Jhanji |
| 7,299,217 B2 | 11/2007 | Oni |
| 7,305,350 B1 | 12/2007 | Bruecken |
| 7,310,676 B2 | 12/2007 | Bourne |
| 7,324,957 B2 | 1/2008 | Boys |
| 7,337,456 B1 | 2/2008 | Nihei |
| 7,343,317 B2 | 3/2008 | Jokinen et al. |
| 7,346,839 B2 | 3/2008 | Acharya et al. |
| 7,383,243 B2 | 6/2008 | Conkwright et al. |
| 7,392,057 B2 | 6/2008 | Lee |
| 7,424,541 B2 | 9/2008 | Bourne |
| 7,437,408 B2 * | 10/2008 | Schwartz ............ H04L 63/0245 709/204 |
| 7,454,464 B2 | 11/2008 | Puthenkulam et al. |
| 7,463,890 B2 | 12/2008 | Herz et al. |
| 7,493,372 B2 | 2/2009 | Crabtree et al. |
| 7,512,612 B1 | 3/2009 | Akella et al. |
| 7,530,021 B2 | 5/2009 | Cheng et al. |
| 7,539,697 B1 | 5/2009 | Akella et al. |
| 7,593,605 B2 | 9/2009 | King et al. |
| 7,593,740 B2 * | 9/2009 | Crowley ............... H04M 3/42 455/414.2 |
| 7,627,895 B2 | 12/2009 | Gifford et al. |
| 7,630,986 B1 * | 12/2009 | Herz ................... G06Q 10/10 |
| 7,668,832 B2 | 2/2010 | Yeh et al. |
| 7,707,122 B2 * | 4/2010 | Hull ................... H04L 51/12 705/319 |
| 7,797,390 B2 | 9/2010 | Hagale et al. |
| 7,813,741 B2 | 10/2010 | Hendrey et al. |
| 7,822,635 B1 | 10/2010 | Brown et al. |
| 7,831,679 B2 * | 11/2010 | Apacible ............ G06F 15/16 709/209 |
| 7,844,283 B2 | 11/2010 | Ruse et al. |
| 7,860,758 B2 | 12/2010 | McCrossin et al. |
| 7,890,581 B2 * | 2/2011 | Rao .................. G06Q 30/08 709/204 |
| 7,904,511 B2 * | 3/2011 | Ryan .................. H04L 63/08 709/204 |
| 7,917,587 B2 | 3/2011 | Zeng et al. |
| 7,974,849 B1 * | 7/2011 | Begole ............... G06Q 10/0631 705/1.1 |
| 8,046,797 B2 | 10/2011 | Bentolila et al. |
| 8,452,653 B1 * | 5/2013 | Gottfurcht ........... G06Q 20/105 705/14.25 |
| 8,462,048 B2 | 6/2013 | Percy et al. |
| 8,467,507 B2 | 6/2013 | Timmins et al. |
| 8,527,869 B2 | 9/2013 | Hosea et al. |
| RE44,559 E * | 10/2013 | Flinn .................. G06N 5/04 706/12 |
| 8,554,592 B1 | 10/2013 | Merz |
| 8,788,592 B1 | 7/2014 | Mutreja et al. |
| 9,319,390 B2 | 4/2016 | Yu et al. |
| 9,516,470 B1 | 12/2016 | Scofield et al. |
| 9,742,615 B1 | 8/2017 | Wick et al. |
| 2002/0013735 A1 | 1/2002 | Arora et al. |
| 2002/0016740 A1 | 2/2002 | Ogasawara |
| 2002/0046259 A1 | 4/2002 | Glorikian |
| 2002/0052873 A1 * | 5/2002 | Delgado ................. G06Q 30/02 |
| 2002/0059092 A1 * | 5/2002 | Naito et al. ............... 705/10 |
| 2002/0059201 A1 * | 5/2002 | Work ................... G06Q 10/10 |
| 2002/0068583 A1 | 6/2002 | Murray |
| 2002/0069101 A1 | 6/2002 | Vincent |
| 2002/0111154 A1 | 8/2002 | Eldering et al. |
| 2002/0111172 A1 | 8/2002 | DeWolf et al. |
| 2002/0116330 A1 | 8/2002 | Hed et al. |
| 2002/0138433 A1 | 9/2002 | Black et al. |
| 2002/0147619 A1 | 10/2002 | Floss et al. |
| 2002/0161627 A1 | 10/2002 | Gailey et al. |
| 2002/0161647 A1 | 10/2002 | Gailey et al. |
| 2002/0169668 A1 | 11/2002 | Bank et al. |
| 2003/0014373 A1 | 1/2003 | Perge et al. |
| 2003/0033526 A1 | 2/2003 | French et al. |
| 2003/0063072 A1 | 4/2003 | Brandenberg et al. |
| 2003/0137419 A1 | 7/2003 | Gehlot et al. |
| 2003/0137424 A1 | 7/2003 | Gehlot et al. |
| 2003/0167324 A1 | 9/2003 | Farnham et al. |
| 2003/0171977 A1 | 9/2003 | Singh et al. |
| 2003/0220835 A1 * | 11/2003 | Barnes, Jr. ......... G06F 3/04842 705/14.36 |
| 2003/0220982 A1 | 11/2003 | Tran et al. |
| 2004/0002348 A1 | 1/2004 | Fraccaroli |
| 2004/0002897 A1 | 1/2004 | Vishik |
| 2004/0009750 A1 | 1/2004 | Beros et al. |
| 2004/0014486 A1 | 1/2004 | Carlton et al. |
| 2004/0039814 A1 | 2/2004 | Crabtree et al. |
| 2004/0111360 A1 | 6/2004 | Albanese |
| 2004/0116119 A1 | 6/2004 | Lewis et al. |
| 2004/0120298 A1 | 6/2004 | Evans et al. |
| 2004/0122803 A1 | 6/2004 | Dom et al. |
| 2004/0122855 A1 | 6/2004 | Ruvolo et al. |
| 2004/0128152 A1 | 7/2004 | Austin et al. |
| 2004/0128301 A1 | 7/2004 | Thint et al. |
| 2004/0148275 A1 * | 7/2004 | Achlioptas .......... G06F 16/9535 |
| 2004/0162830 A1 | 8/2004 | Shirwadkar et al. |
| 2004/0203616 A1 | 10/2004 | Minear et al. |
| 2004/0203719 A1 | 10/2004 | Ross et al. |
| 2004/0205002 A1 | 10/2004 | Layton |

(56) References Cited

U.S. PATENT DOCUMENTS

| | | | |
|---|---|---|---|
| 2004/0236547 A1 | 11/2004 | Rappaport et al. | |
| 2005/0015432 A1 | 1/2005 | Cohen | |
| 2005/0021369 A1* | 1/2005 | Cohen | H04L 67/306 |
| | | | 705/2 |
| 2005/0021750 A1* | 1/2005 | Abrams | 709/225 |
| 2005/0032528 A1 | 2/2005 | Dowling et al. | |
| 2005/0038876 A1 | 2/2005 | Chaudhuri | |
| 2005/0043996 A1 | 2/2005 | Silver | |
| 2005/0048961 A1 | 3/2005 | Ribaudo et al. | |
| 2005/0054352 A1 | 3/2005 | Karaizman | |
| 2005/0080861 A1 | 4/2005 | Daniell et al. | |
| 2005/0096084 A1 | 5/2005 | Pohja et al. | |
| 2005/0113137 A1 | 5/2005 | Rodriguez et al. | |
| 2005/0131716 A1 | 6/2005 | Hanan et al. | |
| 2005/0146417 A1 | 7/2005 | Sweatte | |
| 2005/0165762 A1 | 7/2005 | Bishop | |
| 2005/0171955 A1 | 8/2005 | Hull et al. | |
| 2005/0174975 A1 | 8/2005 | Mgrdechian et al. | |
| 2005/0177385 A1 | 8/2005 | Hull et al. | |
| 2005/0177614 A1 | 8/2005 | Bourne | |
| 2005/0187818 A1* | 8/2005 | Zito et al. | 705/14 |
| 2005/0197846 A1 | 9/2005 | Pezaris et al. | |
| 2005/0198031 A1 | 9/2005 | Pezaris et al. | |
| 2005/0198305 A1 | 9/2005 | Pezaris et al. | |
| 2005/0210387 A1 | 9/2005 | Alagappan et al. | |
| 2005/0216336 A1 | 9/2005 | Roberts et al. | |
| 2005/0216337 A1 | 9/2005 | Roberts et al. | |
| 2005/0228860 A1 | 10/2005 | Hamynen et al. | |
| 2005/0256755 A1 | 11/2005 | Chand et al. | |
| 2006/0004631 A1 | 1/2006 | Roberts et al. | |
| 2006/0004891 A1 | 1/2006 | Hurst-Hiller et al. | |
| 2006/0031368 A1 | 2/2006 | Decone | |
| 2006/0047825 A1 | 3/2006 | Steenstra et al. | |
| 2006/0085419 A1 | 4/2006 | Rosen | |
| 2006/0136419 A1* | 6/2006 | Brydon | G06Q 10/107 |
| 2006/0161599 A1 | 7/2006 | Rosen | |
| 2006/0195361 A1 | 8/2006 | Rosenberg | |
| 2006/0212931 A1 | 9/2006 | Shull et al. | |
| 2006/0270419 A1 | 11/2006 | Crowley et al. | |
| 2010/0317420 A1 | 12/2010 | Hoffberg | |
| 2011/0238755 A1 | 9/2011 | Khan et al. | |
| 2011/0282750 A1 | 11/2011 | Rosen | |
| 2012/0030193 A1 | 2/2012 | Richberg et al. | |
| 2012/0150888 A1* | 6/2012 | Hyatt | G06F 21/6254 |
| | | | 707/758 |
| 2012/0158751 A1 | 6/2012 | Tseng | |
| 2013/0196690 A1 | 8/2013 | Crowley et al. | |

FOREIGN PATENT DOCUMENTS

| | | |
|---|---|---|
| GB | 2388493 | 11/2003 |
| KR | 10-2004-0073803 | 8/2004 |
| WO | 1990/13828 | 11/1990 |
| WO | 2001/15480 | 3/2001 |
| WO | 2002/01405 | 1/2002 |
| WO | 2002/28125 | 4/2002 |
| WO | 2002/37323 | 5/2002 |
| WO | 2002/062092 | 8/2002 |

OTHER PUBLICATIONS

Hinze A., Voisard A. (2003) Location- and Time-Based Information Delivery in Tourism. In: Hadzilacos T., Manolopoulos Y., Roddick J., Theodoridis Y. (eds) Advances in Spatial and Temporal Databases. SSTD 2003. Lecture Notes in Computer Science, vol. 2750. Springer, Berlin, Heidelberg. (Year: 2003).*

"In Trepia", Web Posting—iWire—http://www.thesociety/net/archives/ 000321 html; Jan. 13, 2003 2 pages.

"My box of cruft—Trepia", Web Postings—http://cruftbox.com/ blogiarchives/000631 html; Apr. 2003. 3 pages.

"News", WebArticle-democracy-online.org; http://www.democracy-online.org/weblogarchief en/2003 1001 weblog axchiefhtml• Oct. 2003. 5 pages.

"Scenarios", Web Printout—Trepia: your instant community; http:// www.trepia.com/scenarios; [Undated: printed in Dec. 2003]. 1 page.

"Serendipity: An application for mobile phones that can instigate interactions between you and people you don't know, but probably should", MIT Media Lab, Feb. 13, 2005. http://ttt.media.mit.edu/ impact/serendipity.html.

"So Much For Trepia", Web Article—slackerbit.ch; http://slackerbit. ch/archives/2003/06/04/so much for trepia.htm; Jun. 1, 2003. 1 page.

"Trepia: your instant community", Web Article; http://www.trepia. com/; [Undated: printed Dec. 11, 2003]. 1 page.

"Trepia: your instant community", Web Printout—http://www.trevia. comitour; [Undated: printed on Dec. 11, 2003;, 4 pages.

"Who owns the modem day social software meme? (A time line)", Weblogs, Inc. Staff; Web Article—The Social Software Weblog • http://socialsoftwareweblogsinc.com/entry/6821616637326827; Oct. 14, 2003; 2 pages.

Bidgoli, "The Internet Encyclopedia", Copyright © 2004 by John Wiley & Sons, Inc. All rights reserved. Published by John Wiley & Sons, Inc., Hoboken, New Jersey.

Boutin, "Putting the World into the Wide Web", Paul; Web Posting;—Webhead; http://slate.msn.com/id1208373; May 30, 2003. 2 pages.

Burkeman, "Stuff the office—let's all go to the beach", Web Article—The Guardian; http://www.g-uardian.co.ukiprint/0.3858 4719576-103680.00 httn1; Jul. 25, 2003. 3 pages.

Cashel, "Interview With Adrian Scott, Ryze", Online Community Report; http://www.onlinecommunityreport.corn/features/scott; Dec. 2002. 2 pages.

Coleman, "Dav's Friendster Network (partial)", Day; Web Page—hap:11bl ogospliere.hcadmap.com/friendster/day. html, [Undated: printed Dec. 11, 2003.] 2 pages.

Eagle, et al., "Social Serendipity: Mobilizing Social Software", Pervasive Computing. pp. 28-34. Apr.-Jun. 2005. http://realitycommons. media.mitedu/pdfs/serendipity.pdf.

Eagle, et al., "Social Serendipity: Proximity Sensing and Cueing", MIT Media Laboratory Technical Note 580. http://ttt.media.mit.edu/ research/TR-580.pdf. May 2004. (Year: 2004).

Guterman, "The Net's Killer App Keeps Connecting People", Business 2.0; http://business2.0.com/b2/subscribersiarticles/print/0 17925 515823 00 html; Jun. 18, 2003. 2 pages.

Kaasinen, "User Needs for Location-Aware Mobile Services", http:// www.techkwondo.com/external/pdf/reports/user_need_for_location_ mobile_svcs.pdf). Aug. 1, 2002.

Kharif, "The Net: Now, Folks Can't Live Without It", Business Week/Online; hotto://www.businessweek.com:/print/technology/ content/Jun. 2003/tc20030610 1865 tc104; Jun. 10, 2003. 4 pages.

Maass, "Location-aware Mobile Applications Based on Directory Services", https://impact.asu.edu/~cse591uc/papers/p157-maass. pdf. 1998.

Mayfield, "Social Networking Models", Web Article—Ross Mayfield's Weblog, Markets, Technology and Musings http://radio.weblogs. com/0114726/2003/03/30.html • Mar. 30, 2003. 5 pages.

Munson, et al., "Location-Based Notification as a General-Purpose Service", http://dl.acm.org/citation.cfm? d=570713. Sep. 28, 2002.

Ojeda-Zapata, "You are here", Web Posting—TwinCtties,com; http:/ www.twincities.com/mid/pioneerpress/business/technology/ 5987828 htrn; Jun. 1, 2003. 3 pages.

Riordan, "Idea for Online Networking Brings Two Entrepreneurs Together", The New York Times; http://www.nytimes.comi2003/ 12/01/technology/Olpatthind?pagewanted—print & position-; Dec. 1, 2003. 2 pages.

Rosen, "U.S. Appl. No. 60/620,456", System and Method for Location Based Social Networking, filed Oct. 19, 2004; 34 pages.

Rosen, "U.S. Appl. No. 60/727,977", System and Method for Location Based Social Networking, filed Oct. 17, 2005; 58 pages.

Shirky, "Social Software and the Politics of Groups", http://shirky. comiwritings/grotippolitics.html; Mar. 9, 2003. 5 pages.

Wah, "Wiley Encyclopedia of Computer Science and Engineering", Wiley-interscience, published Nov. 2008, 2362 pages.

Ward, "New mobile message craze spreads", Web Article—BBC News http://news.bbceo.Uk/go/pr/fr/-/Uhi/technology/3237755 stm; Nov. 4, 2003. 2 pages.

* cited by examiner

SOCIAL NETWORK FOR MAPPING GRADATIONS TO TARGET INTENT

CROSS REFERENCE

This application is a continuation of, and claims priority from U.S. patent application Ser. No. 11/253,848, filed Oct. 18, 2005, now U.S. Pat. No. 8,019,692 entitled, "System and Method for Location Based Social Networking", which claims the benefit of U.S. Provisional Application No. 60/620,456, entitled "System and Method for Location Based Social Networking", filed Oct. 19, 2004, and of U.S. Provisional Application filed Oct. 17, 2005, entitled "System and Method for Location Based Social Networking", the benefit of the earlier filing date of all of which is claimed under 35 U.S.C. § 119(e) and all are incorporated herein by reference in their entirety.

This application is related to co-pending U.S. patent application Ser. No. 11/253,848, filed Oct. 18, 2005, and entitled "System And Method For Location Based Matching and Promotion".

FIELD OF THE INVENTION

The field of the present invention relates generally to a system and method for generating and collecting profile information regarding people and entities and matching or filtering said people and entities based on that profile information.

BACKGROUND OF THE INVENTION

Social networking systems may use profiles to connect people who might like to meet each other. The idea of connecting strangers or friends who might not otherwise meet is powerful. However, the value of these systems may be limited by the rudimentary methods used to make matches: basic preference characteristics such as a common business relationship, social relationship, family relationship, compatible physical characteristics, or self-declared preferences for food, clothing, leisure activities, sports, entertainment, music, art, etc.

A key problem with such basic social networking systems is a lack of verifiability and authenticity of match criteria, leading to a surfeit of low quality matches. Too many low quality matches can lead to a loss of faith in the entire system, poor usability overall, and questions of trust when you meet people (or connect to entities) through such matching criteria.

Another problem is that such systems force users to do the tedious work of creating self-generated profiles by inputting personal information, akin to filling out a questionnaire. This creates two problems: inconvenience for participants and a lack of standards that everyone can trust. First, many people are busy, or lazy. Any system that relies on its users creating and updating multivariable profiles is inherently flawed. Too many people will let their profiles become stale. Second, people have different standards when it comes to self-declared information. I may think I am a connoisseur of wine, whereas by someone else's definition I am a novice. In addition, the information I supply in creating my profile may not be useful for distinguishing me from other users in the system. For instance, I may mention that I am a Red Sox fan in my self-generated profile. However, this information may not be useful for distinguishing among the thousands of other Red Sox fans in the Boston area. Subtleties are lost. For example, I may be a diehard fan and want to meet others who, like me, have season tickets. In other words, gradation information can be important and is sometimes either lost or mischaracterized with self-generated profiling.

What is desired therefore is an improved system and method that adds accountability and standards to user profiles, ideally one which does not burden the user with the cumbersome task of building and maintaining a profile. What is also desired is an improved system and method for location- and context-based matching and filtering of users. What is also desired is an improved system that allows not only people to be matched with other people but also people to be matched with "entities", such as restaurants, bars, organizations, parties, stores, and even cities.

SUMMARY OF THE INVENTION

Aspects of the present invention relate to systems and methods for social networking. Location-related data and other behavioral and exogenously generated characteristics are used to replace or supplement self-generated profiles in order to enhance the quality and trustworthiness of the matches made using the system and facilitate the inputting of profile information.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
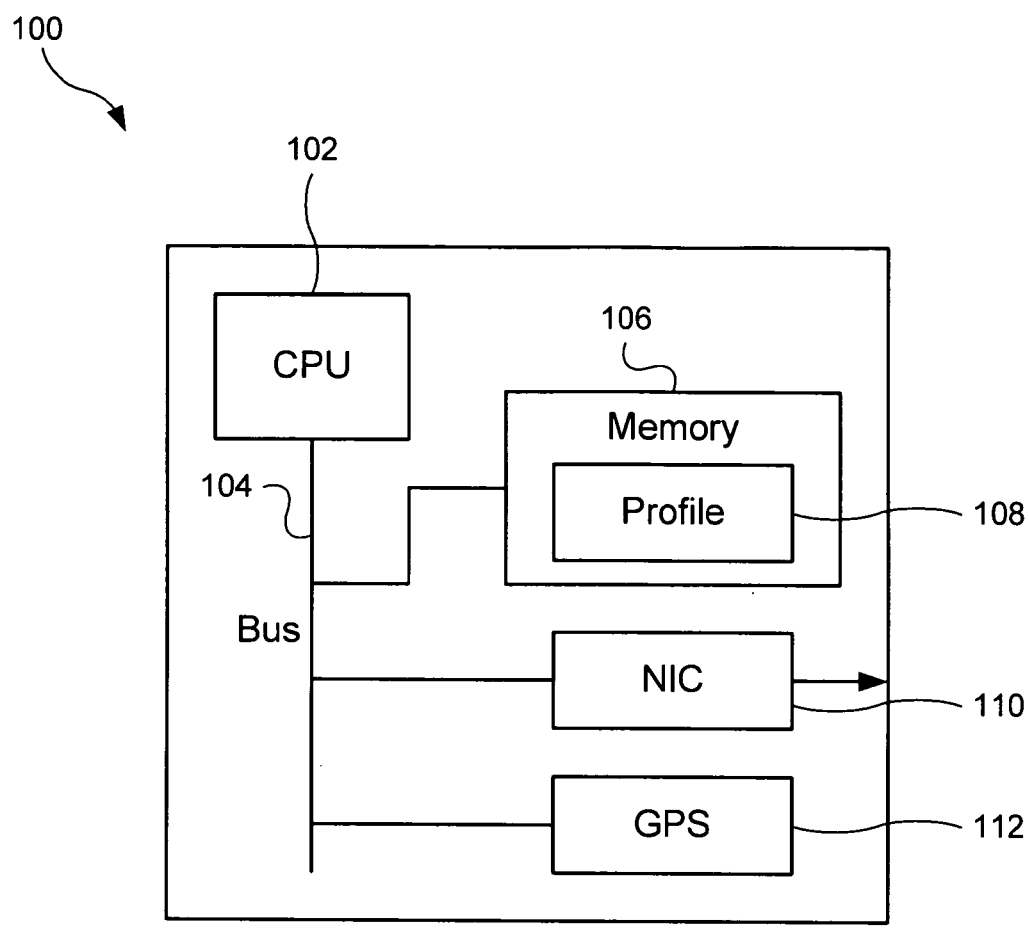
FIG. 1 is a block diagram of a mobile device that may be used in connection with embodiments of the present invention.

An example embodiment of the present invention provides a system and method for collecting and generating profile information for users of mobile devices and for matching users based on those profiles. In particular, the mobile device may generate or receive location based information to augment both the generation of profile information and the use of that information to match users in different contexts. In particular, both the profiles and the way that they are used may change based on a user's location and programmable filters and settings established by the user. For instance, a user at a night club on a Saturday night may be notified of friends who are nearby or of other users who have common friends or other characteristics that would indicate a match or facilitate a social meeting. On the other hand, different profile information and filters may be used when the user is at a trade show on a work day. Context may be set easily by the user (by manually selecting "work mode", "socializing mode", etc.) and/or set by the device automatically based on time, place, or other parameters. To this end, devices may use certain programmable logic to determine context automatically, including use of statistics to guess, for example, that given a combination of place, time, and other factors, the user is most likely in "socializing mode," thus saving the user the trouble of periodically having to adjust the settings of his device.

Profile information may be generated from behavioral characteristics of the user, exogenously generated characteristics, and user-specified information. In addition, the profile may include a unique identifier as well as one or more pseudonyms or temporary identifiers for privacy purposes. Profiles may then be used to propose matches between users or provide users with icebreakers (topics of conversation suitable for initiating a conversation).

The data fields in the user profile may be tagged to indicate the type of data (behavioral, exogenous, user-specified, or other type) as well as the quality of the data for matching purposes. Quality factors may include an indication of relevance of the particular data to the user and confidence in the accuracy of the information. For example, data may be collected based on the locations visited by the user. However, if location tracking has been disabled on most days, the data regarding a small set of locations visited by the user may not provide meaningful information regarding the user's behavior. In addition, confidence in the data may depend upon the source of the data (e.g., whether it is user-specified or obtained from an exogenous source) or whether the data has been verified by a reliable source. For instance, my user profile may indicate that I am friends with Joe Smith. This information may provide a useful way to match people who have common friends. However, Joe may not consider me to be a friend at all. Thus, a bona fide friend of his may be misled into meeting me, believing me to be a friend of Joe's, only to find out later that Joe hardly knows me. This kind of confidence problem may arise frequently without some means of qualifying the reliability of data used for matching. Without other indicia of confidence in the data, the usefulness of the information may be undermined, calling into question the entire matching system. Given that the matching system is intended to instill trust in connections, this could lead to abuses where people end up feeling tricked, having trusted the system, only to find that they have made associations based on false pretenses. On the other hand, the confidence in this information (and in the system generally) may be enhanced if Joe has acknowledged, verified, or even rated our relationship, or (another way of accomplishing the same thing) if my behavioral profile indicates (through GPS tracking or other means) that I spend a lot of time physically with Joe, or if I regularly communicate with him by phone or email. Supplementing user-submitted information with behavioral information obtained from observed behavior can thus significantly increase the credibility of data used to make matches, and thus improve the overall user experience.

Figure 2:
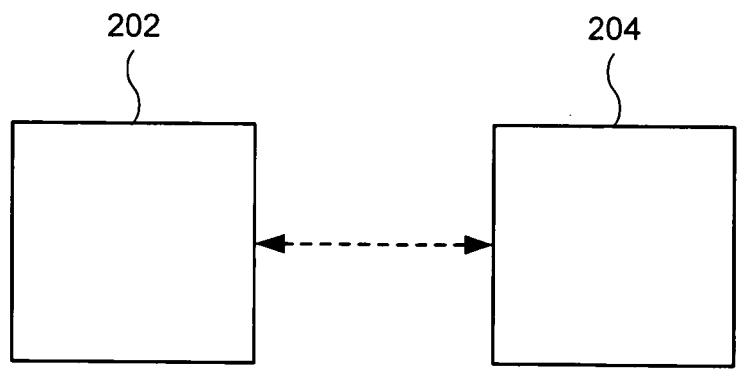
FIG. 2 is a block diagram illustrating the direct exchange of information between mobile devices according to an example embodiment of the present invention.

FIG. 1 is a block diagram of an example mobile device 100 that may be used in connection with embodiments of the present invention. The mobile device may be, for example, a personal digital assistant (PDA), cellular telephone, laptop computer, pager or other communications device. The example device 100 includes a central processing unit 102, memory 106, network interface card (NIC) 110, global positioning system (GPS) 112 and a bus 104 for communications among these components. The memory 106 may store profile information 108, including profile information regarding the user of the mobile device 100, target profiles for matching other users and settings and filters for the use of those profiles. The memory 106 may store the profiles in a relational database, flat file system or other database or file format. The storage of this information on device 100 allows matching to occur on an ad hoc basis when other devices are encountered (e.g., through Bluetooth or other communications interfaces), whether or not there is a connection to a particular network or server. For instance, FIG. 2 illustrates two mobile devices 202 and 204 using direct communication to exchange selected profile information (which may include, for example, target profiles indicating potential matches). Either device may determine whether there is a match and send a notification to the other user.

The profile information 108 may be used by application software stored in memory 106 and processed on CPU 102. All or part of this information may also be stored on a separate network server that may generate, maintain and process user profiles. NIC 110 or other network interface provides access to an external network to allow communications with the network server and/or other mobile devices.

In some embodiments, the user may participate through use of a passive identifier, such as a card in his wallet. And if the system can track the user by his physical properties alone, such as with casino-style cameras connected to computers running face recognition software or through other biometric identifiers, the user may in fact participate without having to do or carry anything; his profile gets updated and retrieved as necessary by the system as it "watches" him. In some embodiments, the devices and equipment contemplated to use this system may be replaced by chips and devices embedded into people's bodies, biometric identifiers, and other tracking technologies. Accordingly, embodiments of the present invention are not limited to smart phones and other mobile devices and may be adapted to encompass other enabling technologies.

GPS 112 generates location data that can be used for generating profile information as well as matching users. Other location based information may be generated or received instead of, or in addition to, position information generated from a global positioning system. In some embodiments, location information may be generated based on a cellular telephone network (e.g., based on the cell where the phone is located or through more sophisticated triangulation techniques), or by determining proximity to a device or network access point for which location data is available. In other words, a device without location data can know its location, at least approximately, if it can communicate, either directly or indirectly, with a device that does know its location (for example, devices that rely on GPS but are indoors and unable to see the sky can be daisy-chained to pass along location information from a nearby device that can see the sky). In addition, a particular venue may broadcast or otherwise provide information about a particular location, event or activity (e.g., through bluetooth, Wi-Fi or other mechanism). When a user enters or leaves a nightclub, amusement park, sports arena, concert hall or other venue a message may be sent to the mobile communication device indicating the location or other information about the event or activity. Different messages may be sent for different parts of the venue, so that, for example, a device of a user at a multi-screen movie theatre can know which movie the user sees. A local triangulation system or mechanism to determine relative locations of users may also be used to identify specific "micro-locations" or help users find each other within a venue, which can be useful especially when the users don't know each other, for instance, if a match occurs between strangers in a crowded bar (micro-location methods might include the strength and direction of the signal received between two users and thus work like a compass, with an arrow pointing towards the target user and a "hot-cold" meter to indicate distance). The identification of other users and devices within a specified range may be collected and time stamped for use in the user's profile, incorporating safeguards for privacy (such as the recording and time-stamping of certain meta-information, instead of names, about people in your vicinity). In addition, if other users and devices contain location information (such as a GPS position, user entered location, etc.) this information can also be associated with the profile even if the user's device is not able to generate this information.

Data relating to people at the same venue can be used to enhance the user's profile. For example, if a user goes to a bar populated by people in their 20's and 30's who work in financial sector jobs, this can be used to "teach" the system about that user, which can inform matching choices. Similarly, information that is known about people who visit a given location can be used to build the profile of the place itself; thus, a bar may develop an "entity profile" as a hangout for motorcycle enthusiasts, Red Sox fans, or both, depending on the time of day or whether there is a game being played that day at Fenway Park. When an entity has profile information associated with it, this information can then be accessed in advance by anyone who is thinking of going to that bar. Profile matching algorithms could be used to predict whether you would be compatible with the regular customers of that bar. A feedback system could be employed, using behavioral information (such as whether a user repeatedly frequents a particular bar or "type" of bar and/or user-declared information (such as when a user explicitly evaluates his experience at a given place)). An entity's profile and its patrons' profiles can interact dynamically, building on each other and evolving over time as warranted.

This process of choosing places to spend time, such as bars, nightclubs, schools, restaurants, country clubs, vacation resorts, companies (where you might be employed), etc. is something that happens today without any help from technology: people go to places and return if they like them. Or they go to places based on recommendations from friends. Embodiments of the present invention serve to remove some of the time and effort, and simultaneously introduce an element of statistical analysis, into a human process that is inefficient and characterized by trial-and-error. This is not intended to eliminate the serendipitous nature of human discovery or trump subjective recommendations; rather, it is intended to be helpful as a supplemental guiding system.

Figure 3:
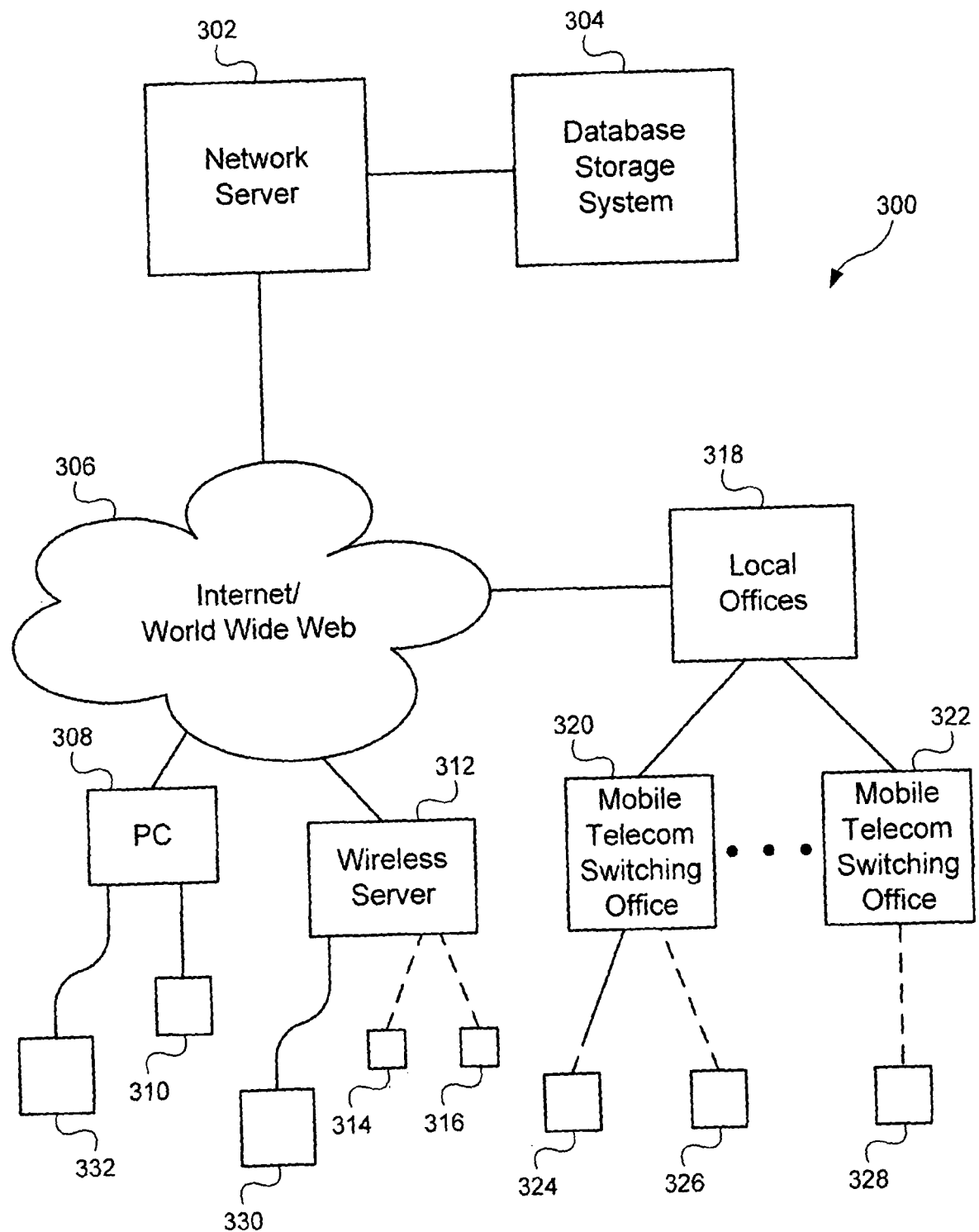
FIG. 3 is a diagram illustrating a network system according to an example embodiment of the present invention.

FIG. 3 is a diagram illustrating a network 300 according to an example embodiment of the present invention. The network 300 includes a network server 302 and a database storage system 304. The database storage system 304 stores profile information regarding users of the system. The database storage system 304 may store the profiles in a relational database, flat file system or other database or file format. Network server 302 collects information from the mobile devices and other sources to generate profile information. For instance, network server 302 may collect information regarding the use of email accounts to communicate with other users of the system. Network server 302 also collects information about the locations of users and processes profiles to match users based on this information. While some or all of this information may be stored on individual devices and allow for ad hoc matching, the use of a network server allows information about venues to be collected whether or not a particular user is at that location. For instance, the server may determine the number of users at a particular night club and the number of users who are potential matches or whether specified friends are at that location. A user may request this information in advance to decide whether to go to a particular location. Aggregated (or individual) profile information may also be provided for purposes of evaluating advertising opportunities at a particular venue (e.g., determining which ads should be displayed on a monitor at a sporting event depending upon the profiles of the users at that event) or for other purposes. The network server 302 can also be used to collect historical information about venues and the people who go there. Such information can be useful to people interested in knowing patterns, such as who frequents the venue and when. A user might want to know, for example, whether a given club tends to be frequented by people who have friends in common with him. Similarly, if he is planning an illicit rendezvous, he may want to verify that nobody he knows is at the venue now, or a regular patron, or even likely to appear there (likeliness being determined by statistical analysis and cross-matching of his acquaintances' profiles with the entity's profile).

In an example embodiment, the server 302 is connected to the Internet 306 for communications with other devices. In other embodiments, the server may be connected directly to a wireless network, cellular telephone system or other network. In the example embodiment, mobile devices 310, 314, 316, 324, 326 and 328 may be connected to the Internet (or other networks) through a variety of methods to allow communication with server 302 and other mobile devices. For instance, device 310 may be synchronized with a personal computer 308 that provides a connection to the Internet. Data may be exchanged with the server through the personal computer 308. In addition, data for a user profile may be entered through the personal computer 308 whether or not it is connected to particular mobile device. Similarly, data for a user profile may come from a (networked) appliance (330, 332), such as a DVR, smart card, digital book reader, etc. Mobile devices 314 and 316 may also be connected to the network through a wireless server 312 that provides a connection to the Internet. For instance, wireless "hot spots" are increasingly being provided at coffee shops, libraries and other locations and may be provided at night clubs, sporting events or other venues visited by users of the system. Mobile devices 324, 326 and 328 may also be connected to the server 302 through a cellular telephone network. Mobile telecommunication switching offices 320 and 322 may use cellular telecommunications protocols (such as CDMA, GSM, TDMA or other protocol) to communicate with mobile devices 324, 326 and 328. The mobile telecommunication switching offices 320 and 322 may, in turn, be connected to the Internet 306 through local offices 318.

Figure 4:
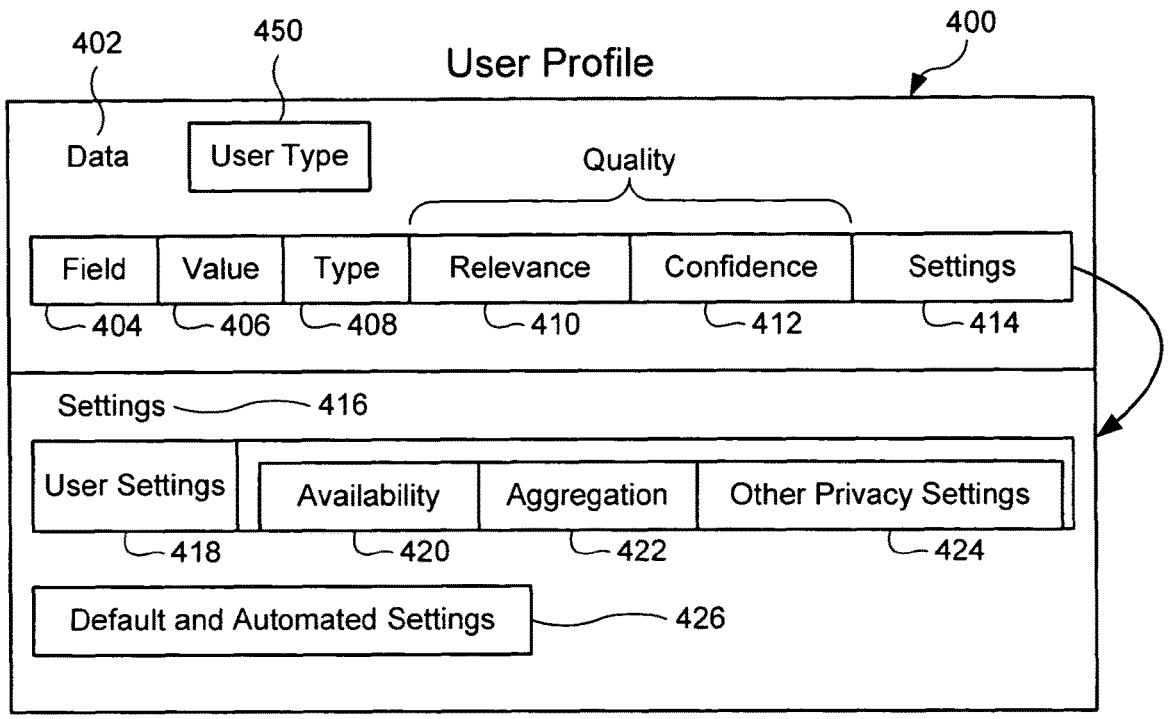
FIG. 4 is a logical diagram of a user profile according to an example embodiment of the present invention.

FIG. 4 is a block diagram of a user profile 400 according to an example embodiment of the present invention. While FIG. 4 illustrates a data structure for an example user profile, it is understood that other databases, data structures and formats may be used to store and associate the desired data in the user profile. A mobile device 100 and/or network server 302 may be used to generate and update a user profile 400. User profiles may also be imported from other systems.

The example user profile 400 may be stored in a relational database and may have associated tables for storing profile data 402 and settings 416. The data table 402 may also include entries for various characteristics to be stored as part of the profile. Each characteristic may be stored as a row in the data table 402. The data table 402 may contain an entry, user type 450, to indicate whether the profile is for a person or entity (such as a restaurant, entertainment venue or the like). For instance, an entry may include a field identifier 404 to identify the entry, a data value 406, the type 408 of the data, quality indicators such as relevance 410 and confidence 412 and a pointer or other link to applicable settings 414 in the settings table 416. The settings table 416 includes settings and parameters that control how entries in the data table 402 are used for matching and other purposes. The settings table 416 includes both user settings 418 and default and automated settings 426 that are established by the system (e.g., application software on a mobile device 100 or network server 302). The user may provide settings that control availability 420 of a data entry for various uses, whether a data entry may be used alone or must be aggregated 422 with other specified information before it can be used and other privacy settings 424. Default settings for each of these options may be established and stored in table 426. In addition, automated settings may be stored by the system in table 426 for options that cannot be changed by the user.

The following is a more detailed description of the data table 402 and examples of the types of entries that may be stored in the table. The data entries include a type 408 indicating how the data was collected or generated. Data types may include behavioral characteristics collected by the system based on the actions of the user, exogenous information collected from sources other than the user, and user-provided information. The data entry also includes indications of the quality and usefulness of the information. In the example shown in FIG. 4, both relevance 410 and confidence 412 can be associated with the data stored in the table. Relevance 410 and confidence 412 may be indicated by a numerical rating based on how the information was collected, generated and/or verified. For instance, relevance 410 may indicate whether behavioral characteristics or composite data was generated from a large sample size. For instance, if the data entry is based on the location of the user, it may only be generated when the user's location can be tracked (which can be controlled by the settings 416 for the device or may be limited by the range and availability of the positioning system). If a user's location is tracked extensively, this data entry may have more relevance as an indicator of the user's behavior. A match might be made, for example, between two people who get coffee at the same cafe every morning. This information could at least be used to serve as an icebreaker. Confidence 412 may also be indicated. A high level of confidence may be associated with data entries generated from behavior that was tracked by the system, data provided in the form of a secure token, or information verified or rated by additional sources, as opposed to user-declared data.

The use of behavioral and exogenously generated information in the user profile can greatly enhance the quality of the matches and types of matches that can be made by the system. The following are example behavioral and exogenously generated characteristics that can be used to enhance a location-dependant matching engine included as part of application software on server 302 and/or mobile devices in accordance with embodiments of the invention.

Phone and Email Usage. Rather than relying on a flat contact list or requiring a user to categorize everyone in a contact list, the network server 302 or mobile device 100 may monitor actual phone, SMS, and/or email usage (and/or any other communications device or account or connected appliance, including PC) to infer who the user really knows as well as some information about the nature of the relationship (business vs. social); a system that collects all of this in an automated fashion will be richer than any system that requires constant manual inputs. If I talk to John Burns every day for an hour, it can be inferred that I know him very well. As a result, I would want to know if John Burns happens to be in the mall that I just entered (and vice versa), whereas I do not necessarily care to meet up with someone who happens to be in my contact list but whom I talked to once, years ago, for five minutes. (Alternatively, there may be situations where a user seeks out looser and more remote connections as these sometimes offer more value as they tend to be more numerous than close relationships and they extend the user's network farther afield, which can particularly be helpful when looking for a job, finding sales prospects, etc. There is a theory that many distant contacts are in fact more valuable, in a business sense, than a smaller group of very close contacts). This actual usage information, when used for matching, is richer than a flat contact list. It also adds a degree of reciprocity: I cannot claim that Gweneth Paltrow is a friend, even if she is somehow on my contact list, because I have never talked to her on the phone. Reciprocity and authenticity are important factors for second degree matching (i.e., two people connected via a mutual acquaintance) as it is important to connect people through a bona fide intermediary if you are going to leverage the instant trust that arises when two strangers find that they know someone in common. It is worth noting that behavioral information can be combined with user-entered information for greater richness. For example, when a user speaks to someone on the phone, a record of such conversation is logged automatically. This record can then be enriched with comments from the user annotating or rating said conversation and said contact.

This data may be entered in a user profile 400 by either network server 302 or mobile device 100 (or a mobile device that connects to a PC). For instance mobile device 100 may be a cell phone with a contact list in memory 106. The cell phone can track the frequency of calls, and amount of time spent on calls, to each person in the contact list. In addition, frequently dialed numbers (or the numbers of people who call you frequently) can be automatically added to the contact list and the data can be associated with the phone number even if other contact information is not available. A laptop computer or mobile email device (which may be the same or different device than the cell phone) can track the number of messages sent and received from various email addresses. This information can be tracked separately or associated with a contact list. The network server 302 and database storage system 304 may allow multiple mobile (or non-mobile) devices to be registered to the same user profile. In this way, both email usage and phone usage may be associated with a particular individual in the user's contact list. The contacts (or particular email addresses or phone numbers) with whom there are communications may be added as entries in the data table 402 of the user profile. For example, a field 404 may be added for a contact such as "John Burns" (which may be linked to other contact information for the person through the relational database). The value 406 may be a number representing the frequency and duration of communications. The type 408 would be classified as behavioral. The relevance 410 may be a number based on whether the sample size is large (has tracking been turned on and for how long) and whether both email and phone accounts have been registered with the system for tracking. Confidence 412 may be a number indicating whether the communications is tied to a full contact record (or just an email address or phone number), whether John Burns is also a registered user, whether he identifies the user as a friend and/or his contact information or communications usage information matches the information in the particular user profile, whether there is a history of physical proximity, or other factors indicating reliability of the data.

Physical Proximity. Just as with regular phone interaction between people, physical proximity can indicate a relationship as well as some degree of its closeness. Bluetooth-enabled mobile devices, for example, may automatically log time which two (or more) people spent together; this can be used to "authenticate" a relationship. This might include "time-shifted" proximity, that is, showing that two people may be in the same place but not at the same time; this can also be supplemental information that is helpful in establishing a relationship (for example, they live in the same dormitory or go to the same library on a regular basis, even if not always at the same time). Physical proximity can be used as a separate data entry or aggregated with telephone and email usage to generate an overall data value to use as a proxy for the level of relationship with others (whether or not registered users of the system).

Where You Go. In addition, the locations that a user visits may be used for matching or to enhance the confidence for other data entries. A field 404 may be added for frequently visited locations. The value 406 may be the coordinates for locations where significant time is spent by the user. This data may be separated by the days and times when those locations are visited to distinguish locations visited during working hours from those visited on the weekend or at night. Venues may also have wireless capabilities and provide tags or tokens with additional information about the places visited (such as a concert hall when a particular artist is performing, amusement park, sporting event, etc.). In addition to using this information for matching, it may be provided to users as potential icebreakers for conversation, for example, to let two people know that they're both Elvis Costello fans (by virtue of the fact that they've seen him in concert)—this is something they might like to discuss as a way of "breaking the ice". It should be added that tokens can be used for verifiability of data if they are digitally signed or otherwise made hard to spoof.

"Where you go" information can also be used by advertisers and other businesses who might want to know more about you for marketing purposes. For example, a token that shows that you saw the same movie multiple times may be useful not just for matching purposes (to signal your interest to other similarly hardcore fans) but also to an advertiser. The Spider-Man marketers might want to hype the sequel by sending out a special message or promotion only to those people who verifiably watched the first movie (in a movie theater) at least three times. This is elaborated upon below.

The data may also be used to enhance the relevance 410 and confidence 412 of other data entries. For instance, if I go to 81 Red Sox games a year, it lends more weight to my interest in the Red Sox than a self-generated profile could. Also, this information does not need to be manually entered by the user. It can be recorded automatically by simply going to Fenway Park on game days (using a location-tracking device or by having my matching device "know" where I am by interacting with a transmitter or mating device at Fenway Park, or with other networked devices at the event). Unlike self-generated characteristics, which are subjective, facts about my location objective and verifiable and can be assigned a high value for confidence 412 in the data table 402. (It can be assumed that spoofing will be a problem as these devices and location-based matching systems become popular, threatening the trustworthiness and usefulness of the systems. Using an authenticating mechanism, like a digitally-signed token, can "prove" to people or other interested parties (such as an advertiser offering a special deal to the most avid fans) that you really were where you (or your profile) indicated you were.

Other Behavior. What cafes you frequent, what gym you go to (and how frequently), what time you wake up, whether you go to church every Sunday, what TV shows you record (or watch) on a digital video recorder (DVR), what websites you visit (and what you purchase, what cookies you have on your computer, or otherwise what you do online) and, for that matter, any behavior using trackable devices or appliances, or trackable activities, all speak to who you are. As such, they can enhance matching and complement or even trump what you might say about yourself in a profile; they are also easier for you to "enter" because it happens automatically (passively, from the user's perspective). These factors can be tracked based on the location/movement of the device and through other devices and systems that are connected (directly or indirectly) to the network server 302 or mobile device (such as a DVR service that tracks the TV shows recorded and watched or a cell phone network that tracks phone usage). It may be desirable to turn off monitoring of these kinds of activities, precisely because it is so easily obtained, to avoid embarrassment as well as to simply protect the user's privacy.

Feedback Systems. Feedback systems can also be used to provide information for generating data entries in the user profile 400. What happens when people have the ability to "tag" you with feedback? Do your ex-girlfriends despise you? If you have in your profile exogenously generated ratings about you, which you can not edit, it can help strangers size you up. As a result, it may lead to "better" behavior since you do not want people ruining your "personality credit rating". In this way, it is similar to an EBay feedback rating, which can be useful to signal to a stranger whether someone can be trusted. In addition, it can also be a fun way to "collect" and show off "friendly behavior points". There is a powerful karmic component to building and maintaining a positive interpersonal rating. These data entries have a different type 408 than the behavioral data entries described above which are tracked by the system. These entries may be tagged generally as exogenous data or more specifically as feedback from another user. The value 406 may be a rating in various categories and may include specific comments as well (which may be viewable to others or not, depending on the nature of the comments, who is seeking access, and other rules that can be applied to this powerful information). The relevance 410 may be based on the amount of feedback received and the confidence 412 may depend upon the person who is giving the feedback (does that person have a positive feedback rating herself?) and whether (through location or communications tracking) a relationship with that person can be verified.

Secure Tokens. Restaurants, bars, clubs, fraternities, churches, universities, and other venues or associations may give out authenticating (digitally signed) "tokens" that can be added to a user's profile. These tokens may generate new data entries 402 or may be used to raise the confidence 412 of an existing data entry. This would let people see if someone is "real": are they really a member of the club, do they really belong to that gym, are they really a graduate of Villanova, did they really get an honorable discharge from the Army, are they really a Delta Platinum Medallion frequent flier? This can be useful in a matching situation: when a woman is at a bar and is open to meeting fellow alumni, it may be important to her to be sure that they are a bona fide graduate of her alma mater, not someone who says he is, or who may have spent some time there but didn't graduate.

People You Know. Contact lists can be a powerful way to match uses—using common acquaintances as intermediaries can be a powerful way to match users. Often the problem is that contact lists are a subset of your actual set of acquaintances. To maximize the effectiveness of contact lists as a matching method, entries (of people you know) may be generated based on ordinary contact lists as well as observed behavior as described above. These entries may also be manually entered by the user, with the confidence 412 augmented (or reduced) by behavioral characteristics (as described above) or exogenous information such as manual feedback from the acquaintance acknowledging the relationship (and its closeness level) or the existence of a corresponding entry in the acquaintance's user profile. As described further below, matches or alerts may be generated when a friend is nearby (based on location data and user profiles) or where a person with one or more common friends is nearby (or actually nearby and with a common friend). For example, the system may want to alert you that a good friend of your best friend happens to be walking past the café where you are eating.

Expanding on this theme, other information can be used to enrich your profile. Some examples: Purchases you make (online or offline) with digital cash or a credit card; the transaction details can be integrated into your profile. EBay feedback ratings can be appended to your profile and used "beyond EBay" (people might only want to date people, or hire people, or do business with people who have high EBay feedback ratings). What dating sites you belong to (and information pertaining to those sites) can be shared with your profile. Even ads you have seen (online or offline)—as well as ads that you responded to in some way—could be valuable to marketers who want to sell things to you. More generally, your credit ratings, police records, medical records, driving records, grades and work performance ratings, and other "scores" from various real-life activities can be integrated into your profile to help with matching, or for other purposes. (In some cases, digital tokens can be used for verifiability.) Uses for this information in your profile might include whether someone wants to date you, hire you, give you credit, offer you a special promotion or show you an advertisement (either online or offline, in the case of a dynamically targeted advertising method such as a changeable billboard).

All of this information can be powerful in helping people quickly learn about and trust strangers. It can also be valuable to businesses as past buying behavior can be a strong predictor of future purchases. Some of the same techniques being developed online, such as to offer ads for dentists to a person who has just done a search at Google for "dentists in Chicago". In this case, by combining a rich array of behavioral data, such as what users search for online, what they buy with their credit cards or digital cash at the mall near their home, what movies they see, what restaurants they eat in, what television shows they record and/or watch, etc., there are quite powerful opportunities for marketers to make one-to-one matches between people and their products. Although we are proposing methods for making connections between people, matches between people and "inanimate entities", such as businesses, are also a key component of this invention. A system that collects and processes behavioral data, including location data, has the ability to send alerts that are marketing in nature which appeal to users and which help businesses. An example is for a store to send an alert to you when you enter their competitor's store, luring you to their store instead perhaps by offering you a discount. Another is to have a billboard change dynamically depending on who is looking at it (and what is known about that user based on his profile). Another is to determine patterns that are useful to marketers, such as the fact that people who watch Red Sox games tend to eat at Dunkin' Donuts twice as frequently as people who don't. In this vein, it can be used to better determine the success (measured as a return on investment) for advertising campaigns. For example, what percentage of people who saw a billboard for Great Adventure alongside a particular highway (as determined by location tracking data) visited there within six months. The granularity of behavioral information discussed herein is far greater than anything that has ever been accomplished before. And while many people would not want their behaviors monitored and movements tracked and combined into a profile and shared with advertisers, they might want this information tracked for some of the social benefits outlined herein, such as meeting friends or being set up on dates with strangers who fit their target profiles. And once this data is being collected for one purpose, people may find that there are incentives to selectively sharing it with marketing companies. Just as gamblers share behavioral information with casinos in order to get complimentary perks, and just as travelers share their flying history with airlines in order to qualify for free flights and preferential treatment, people might appreciate the fact that because they spent $1000 at Prada that every other women's fashion store is sending them "alerts" once they enter a mall, offering special discounts to come into their store. Broadly speaking, incentives to share otherwise personal information with marketers may include (but are not limited to) cash payments, better targeted advertising messages that pertain to one's interests, special offers from companies eager to get their business, and free or subsidized devices or service fees for interacting with the matching system, etc.

Of course, users may decide how, or whether, they want their information shared. In some cases, a user might want to share their otherwise private medical records in order to show that they were recently examined and did not have any sexually transmitted diseases (a signed and date-stamped token may be issued by the doctor or clinic to authenticate this information). In this case, they might stipulate that only a fraction of their medical records may be shared, and only in very specific circumstances. It is assumed that there may be a set of rules empowering users to control this information as they desire. The following describes a simple version of how these rules might apply; it should be understood that the rules have been simplified for practical purposes herein and that the system could be enhanced with more and/or different user controls.

Clearly, the robust and rich set of data that may be tracked and collected to generate user profiles raises privacy concerns. In order to manage the use of the data in the user profiles, a settings table 416 is provided. Each entry in the table may specify a number of settings and parameters to apply to data entries or to the collection of data. An entry in the table 416 may be associated with one or more data entries in data table 402. For instance, user settings 418 may be entered by a user through a mobile device or personal computer. The user may specify an availability 420 setting to indicate whether types or classes of data should be collected or made available for matching purposes. For instance, a user may specify that location data may be collected and used based on specific types of events (nightclubs, sporting events, concerts, etc.), but that other locations should not be tracked or used, such as adult nightclubs. A user may also specify that location data may be made available for matching with another user only if certain conditions are met (for example, using location-based data to alert you when you are within 100 feet of another member of your local Rotary Club, and 10 feet from a member of a different Rotary Club chapter). Similarly, rules may be established for providing a photo, email address, or phone number to another user, for example requiring that there be a mutual exchange of photos. The user may also specify certain times or days or other conditions that limit matching and notifications (e.g., permit matching only on Friday and Saturday nights). A user may also specify that a level of aggregation 422 must be used for matching based on a particular data entry. For instance, the user may not want to allow others to match solely based on an income level entered in the user profile. However, if the match is based on a large amount of aggregated data, or specific types of data with a high confidence, the user may allow income to be included in an abstracted or aggregated form for use by the matching engine (but not to be provided to the other user). Other privacy settings 424 may also be used to restrict the collection or use of data, to have it deleted after a certain period of time, or to restrict its use for matching or disclosure to other users. Just as it is easy for a user to have his behaviors monitored, it should be easy to de-activate recording of behavior when desired.

The user profile 400 may also include default and automated settings. For instance table 426 may specify that behavioral data types cannot be edited by the user, but can be deleted. Just as with EBay's feedback ratings, a user might be able to reset all feedback from other users, but can't simply edit out the feedback comments which he doesn't like. Similarly, it may be desirable to have the system use environmental filters. For example, if you are in a place where you are getting a large number of matches, the device you are using (or the server that it connects to) can apply a filter to send you alerts only for high-quality matches. Similarly, if you are traveling and getting no "hits", the service might lower its thresholds either automatically by using location detection to recognize that you are in a foreign country, or simply by recognizing that you have been getting few (or no) matches during a given period of time.

Figure 5:
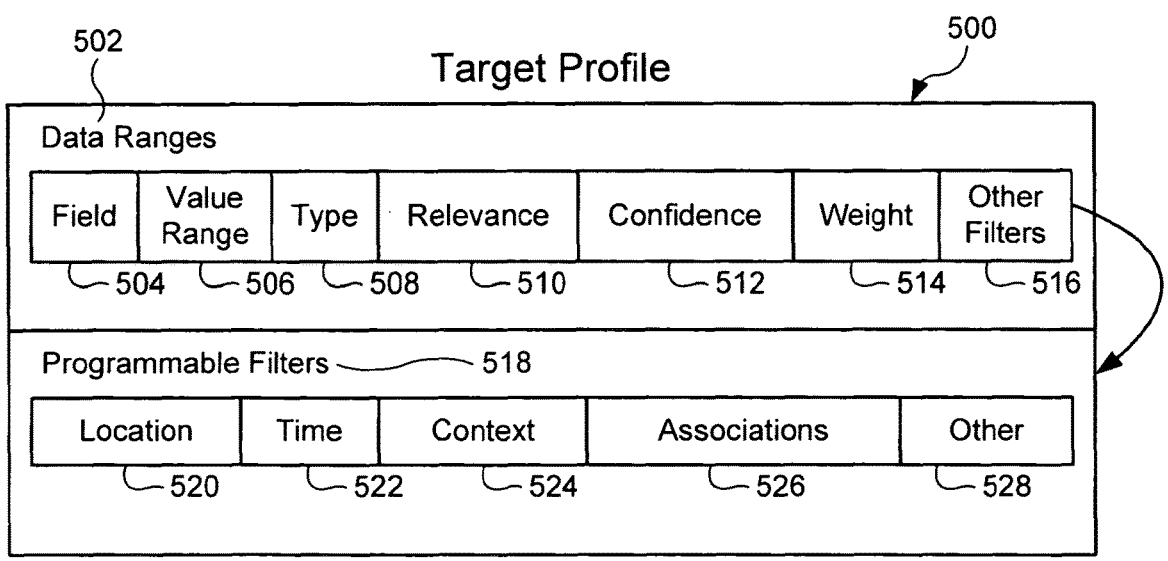
FIG. 5 is a logical diagram of a target profile according to an example embodiment of the present invention.

In an example embodiment, the user may also specify one or more target profiles, (e.g., single women in their 20's with certain other characteristics), for determining whether there are matching users with a particular profile. In particular, a target profile may be used to identify other users who have matching characteristics and are within a certain distance of the user or another specified location. FIG. 5 is a logical diagram of a target profile 500 according to an example embodiment of the present invention. While FIG. 5 illustrates a data structure and the types of fields for an example target profile, it is understood that other databases, data structure and formats may be used to store and associate the desired data in the target profile. A mobile device 100 and/or network server 302 may store one or more target profiles 500 for purposes of matching. Target user profiles may also be imported from other systems, such as online dating services.

In addition to facilitating manually generated target profiles, the system may be able to develop global "matchmaking intelligence" through observing and learning from successes and failures among people who are looking for a mate. For example, the system may "see" a pattern that people who get up early and walk their dogs tend to get along well with other people who do the same and thus use this behavioral information to come up with a "computer-generated target profile for you", different from what you might have chosen for yourself. While a computer would not necessarily be able to assess how people "get along" with each other per se, it can glean this information through direct user feedback, such as when people get married and convey this fact as feedback to the system. It can also infer successful matches by observing, through location-based tracking for example, that two people who met in January have been spending a great deal of time together ever since. With the richness of the data that can be collected and analyzed—exogenous, self-generated, behavioral, etc.—and with the increasing computational power of computers, combined with Bayesian algorithms, neural networks, and other artificial intelligence methods, computers could become good at setting people up, a very "human" skill.

The example target profile 500 may be stored in a relational database and may have associated tables for storing target data ranges 502 and programmable filters 518. The data range table 502 may include a plurality of entries for characteristics for the system to use in determining whether another user matches the target profile. If there is a match an action may be taken based on the settings 416 (e.g., beep or send a notice, or display information about the user or group of users who match). Each target characteristic may be stored as a row in the data range table 502. The entries may correspond to those used for the data table 402 (field 504, value range 506, type 508, relevance 510, and confidence 512), except that threshold values, ranges or wildcard values may be used to specify the requirements for a user profile to match the target profile. In addition, a weight 514 may be assigned to the entry to indicate the importance of that entry in determining whether there is a match. (It should be noted that the same may occur on an ad hoc basis between two devices in a way that requires no centralized database.)

Other filters 516 may also be applied to the entry for matching purposes. A pointer may link or otherwise associate one or more entries in the data range table 502 with programmable filters 518. The programmable filters 518 may specify other conditions for matching in general or for matching a particular entry. For instance, the filter may specify whether a particular entry must match and/or whether only a certain percentage of entries must match. Filters may be based on location 520, time 522, context 524, associations 526 or other conditions 528. Location 520 may be used to filter users who are within a certain distance of the user (e.g., within Bluetooth range or based on specific location data) or at particular locations or at particular events or venues. Location 520 may also be used to automatically adjust matching rules (e.g., when a user is far from home). For instance, if a user is traveling in a foreign country, the rules may only require matching with another user who speaks the same language (or who is from the same country). The user may also have a setting 416 indicating context 524 (e.g., whether the user is at work, at home, at a social event or traveling). Depending upon this context 524, a different target profile or profiles may be selected and used for matching. In addition, the criteria for matching may change automatically depending upon the context 524 (e.g., a user may be notified of any friend that is nearby when traveling, but not while at work). Time 522 may also be used to automatically adjust matching criteria (e.g., using different criteria on a Friday or Saturday night than on a Monday morning).

The system may develop "intelligence" by looking at rules and settings of other users at a given time and/or place and "figure out" certain environmental factors that saves the user from having to manually adjust his settings. For example, the system may be able to differentiate between a bar and a doctor's office through "location memory". If a few users have "mapped" out a location by identifying the characteristics of a particular location (or location coupled with time, in the case of a multi-use facility), this information can be applied to other users who visit that location. In this case, the user might simply set his device to "turn off matching in doctor's offices" or "turn off matching in all places except bars" and the system could respond accordingly to his wishes.

Similarly, the system may learn through feedback: a certain kind of alert may be snoozed repeatedly, thus indicating that this "kind" of alert is unwelcome (whether based on time, place, or other factor). Alternatively, upon getting a match alert, the user might give feedback through the user interface of his device to the system to send "more like this, please". More generally, the system should be trainable to know where's home, work, girlfriend's apartment, etc. so it can learn about you and "make sense" of your behavioral patterns.

Associations 526 may be used to change the matching rules depending who you are with (e.g., your wife or your mistress) and/or who is nearby (e.g., more liberal matching for people who are with or near common friends) and/or who you have relationships with (e.g., whether you have common friends with a high level of relevance and confidence). The use of second degree contacts for matching can be both a criterion in the data range table 502 as well as a filter for determining how other criteria are applied. These entries and filters can be used to notify a user when a close second degree contact is within a certain range or distance (e.g., based on the location 570 filter). A venue or event may also be scanned (by making a request to network server 302) to determine how many friends and/or second degree contacts are at that location. In addition, if users' calendar information is incorporated into their profiles, this information could be used to predict who might be at a particular location in the future. For example, if you are planning to go to Miami for the weekend, you might want to scan the city not just to see who is there currently, but who (among your acquaintances or potential matches) is planning to be there when you will be. In this way, you could be "matched" with a suitable blind date who is flying to Miami from a different city.

A user can also make a specific request to "scan" a person with a mobile device at a particular location (e.g., the woman at the end of the bar) to see if the other person has any friends in common, or just to see her public profile. The network server may retrieve a user profile for the mobile device at the specified location or it may be obtained through a direct Bluetooth or infrared connection with the mobile device. This is especially powerful when combined with quality indicia for the matching information (such as relevance 410 and confidence 412) as it promotes quality second degree matches and filters out spoofers. This scanning process can also result in "icebreaker" conversation topics being identified, to help initiate an interaction between strangers, as described further below.

You can also use filters to block certain matches. For instance, you may be married and nonetheless want to send out "digital vibes" that you are open to discreet romantic approaches. In this case, you could use the matching engine to alert you to second degree connections where the intermediary is your spouse so as to avoid them. It could also selectively block the "vibe" from being sent to any of your spouse's friends, or could be sent anonymously only to people who have expressed similar wishes. This could be specified by using a filter based on associations 526 to modify the availability 420 settings for the mobile device.

Along the same lines, this could apply to people who are not necessarily married but who simply want an anonymous physical encounter, and therefore want to be alerted about other people with similar interests. People seeking such could include this preference in their profile and the system can incorporate this into its matching criteria. Someone seeking this kind of physical encounter would not need to simply go someplace where she is physically proximate to someone with similar desires—this can be done today with anonymous Bluetooth interactions—but could actually decide where to go out tonight based on where there is a high concentration of people with similar preferences. She could do this by scanning a bar, a neighborhood, even a city before she leaves her home. This "one-night stand" matching system could also be made more effective by combining it with other profile data mentioned above. For example, someone may be interested in a one-night stand but only with someone who spends most of his time outside of her town or neighborhood and who has a clean health record with respect to sexually transmitted diseases (this might be a motivation for someone to incorporate medical data in his profile, perhaps using a digital token issued by his doctor).

Mobile devices may also be used by businesses and specific filters may be established for these purposes. Businesses have myriad uses for authentic profile data. When you enter a Prada retail store, if the store knows you make a million dollars a year, or that you spend $1000 a month at a competitive store (because information is communicated and collected from use of your smart card, for example), it may treat you better than someone with no known buying history. Similarly, if you are walking the floor of a tradeshow and have in your profile jobs and even past performance reviews or other desirable characteristics like an electrical engineering degree from a certain school, you may get approached by companies seeking to hire you (especially if you have indicated in your profile that you are open to such overtures).

In certain situations, transfers of authenticated behavioral information can be beneficial to both businesses and consumers. In the example above, for example, the consumer at Prada benefits by getting VIP treatment and perhaps special offers based on proven her past purchasing history.

In addition, consumers can be empowered by exogenously generated data about businesses. Just as a consumer is believed to be a good prospect based on her past buying behavior, a restaurant may passively accumulate profile information about its "behavior". In this case, the restaurant is the "entity" analog to a human user of the system. Every time someone eats at the restaurant, the mobile device may make it easy to rate that restaurant—for example, as you are paying the bill (perhaps with digital cash or a credit card) you are entitled to enter in a rating from 1-10. Your rating will be digitally associated with this restaurant in a user profile 400 for the restaurant (akin to how an ex-girlfriend might rate you). The next person entering (or walking nearby) the restaurant can see these ratings. This information could be stored in database storage system 304 or could be stored in a locally located, tamper resistant device at or near the restaurant (tamper-resistant so the restaurant can't delete or edit negative ratings).

Several key elements distinguish this from Zagat-style restaurant reviews. First, it is designed to be easy to rate a restaurant, right when you are there and the experience is fresh in your mind. Second, users can get high-quality ratings when they need it, i.e., when they are hungry and walking down the street looking for a place to eat, right from a device they're carrying (of course, they could access the same information at other times and places, too). Just as with people being matched with other people, a target profile can be established between a user and restaurants so that the mobile device can notify the user of good restaurant matches and provide ratings to help guide the user's decisions.

Another empowering application for consumers is the use of composite ratings. For instance, Fenway Park can compile aggregated and anonymous information about who goes to games. In this case, someone thinking of going to a Red Sox game can find out what "kind" of people attend games. This composite information may be useful when choosing a bar: what are the composite statistics of its patrons . . . age, gender ratio, income, ratio of locals to tourists, etc. (all of which would be based on data entries 402 in user profiles 400 of those at the bar). Someone may be interested in knowing what the composite of the crowd is like right now, on Friday nights versus Sunday nights, or just in general.

Group information need not only be aggregated and anonymous. It may be used to "scan" a bar, for example, to see if anyone you know—or any second degree contacts, women looking for a one-night stand, friends from work, etc.—are inside. One key benefit is the ability to do this remotely (e.g., by sending a query request to server 302), before you go to the bar, indeed, while you are still at home or work considering where to go. People may also find it useful to get remote composite data about the people who live in cities they may be thinking of moving to (or similarly about neighborhoods), companies they are considering working for, golf clubs they are thinking of joining, resorts they may want to visit, etc.

Embodiments of the present invention also enable a variety of additional applications.

Contests. It can be amusing when you're with friends to compete to see who encounters more acquaintances. With a location-aware matching engine, you do not need to "bump into" people per se—the matching engine will tell you if a friend is within a certain specified distance. The authenticity tests described herein may improve the contest (you can perhaps eliminate work-related acquaintances from the game, or stipulate that only "close friends" count for example, based on a confidence 412 rating).

Karma Points. When two people meet using you as an intermediary, you can earn digital karma points (a score or token in the user profile 400). Karma points may be fun to collect and may also provide a basis for matching (e.g., filtering those users who are good match makers or who have lots of second degree contacts). Inanimate entities can earn karma points as well, such as a neighborhood café, which has been "responsible" for a certain number of matches (that is, people being matched who are regulars at the café). When two people meet using you as an intermediary, you can be alerted that this has happened, and that you have just earned 10 "karma points".

"Ringing Ears". In addition to earning karma points, when two people meet using you as an intermediary, you can be notified (by phone, text message, etc.) and be invited to join the interaction remotely or in person. The settings 416 on a mobile device 100 may cause the device to make a call or send a text message or email to the intermediary when a match is made among common friends. In addition, settings 416 may be used to cause server 302 to send a message to the intermediary.

Riddles and Games. Settings and filters allow creative, interactive matching criteria to be used. As mentioned above, people may have a public profile that is viewable to some or all other users. This profile may be accessed through a "scanning" act, meaning that someone could "point" his device at a person (or her device) and access her public profile. In this public profile, a woman may want to have fun by challenging men to answer a riddle when they approach her, or to sing her favorite song, buy her a margarita, hand her a certain kind of flower, etc. This can make it fun for both parties to break the ice. These preferences for approaches would be revealed when someone "scans" her looking to find a suitable icebreaker topic, or to search for a match "hit" (such as a mutual acquaintance). As a side point, there can be a record kept of every time someone is scanned. A woman may like to know that on a given night, 18 men found her alluring enough to "scan" her.

Digital Wake. Another setting 416 may be used to request notification when certain matches or events occur. A target profile and filter may be established to match users who have been at a nearby location recently (based on a match for a time stamped location entry in data table 402). For instance, the user may be alerted when someone the user knows (as indicated in an data entry in the user profile 400) has passed by the user's location within the last 5 minutes. In this case, he might call his friend to say hello and possibly arrange to circle back and meet nearby. A location 520 filter can also be used to relax this criteria for matching depending upon where the user is located. For instance, if the user is traveling in a foreign country, the user may want to be notified of any friend who has been nearby any time within the last several hours. A user may also want to be notified if a friend is at a prior location visited by the user (e.g., the restaurant where the user had lunch an hour ago).

Figure 6:
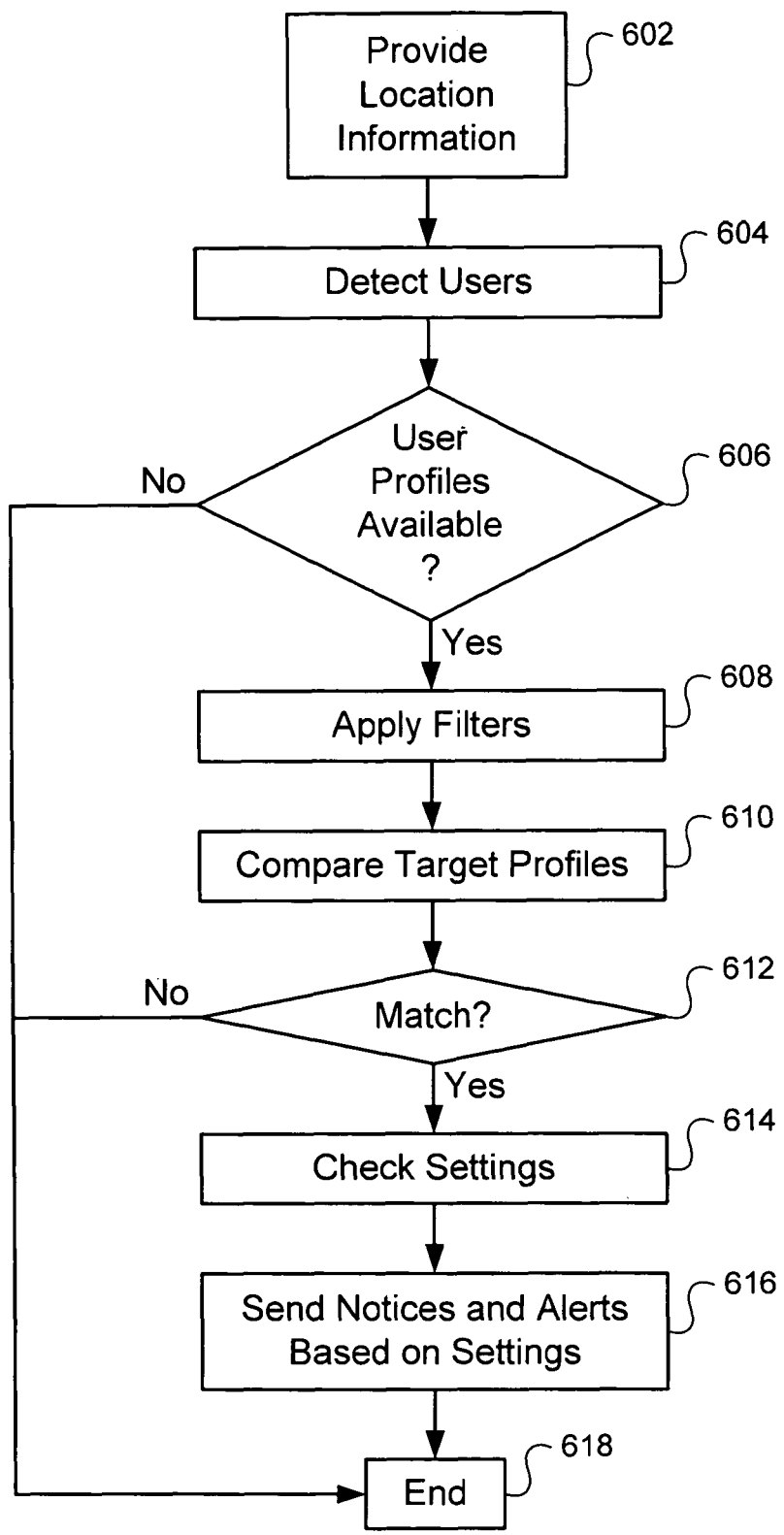
FIG. 6 is a flow chart illustrating a method for matching users according to an example embodiment of the present invention.

FIG. 6 is a flow chart illustrating a method for matching users according to an example embodiment of the present invention. A software application on device 100 or on server 302 may process the user profiles and target profiles to determine whether there is a match and the actions to take if there is a match. Any of the profile information and filters described above may be used and any of the actions described above may be taken based on the information in the user profiles and target profiles. As shown in at 602, location information may be generated or received by the mobile device 100 and processed locally by the device or may be sent to the server 302 for processing. The location information may request users at a specific location or event or within a certain range of the user or a specified location. As shown at 604, other users meeting this criteria are detected (either through direct communications as shown in FIG. 2 or through server 302). Based on availability settings 420, the device or server then determines whether user profiles (or at least those entries required for matching based on desired target profiles and filters) are available for the detected users. If the user profiles are available, they are retrieved and filters are applied to the user profiles and target profiles as shown at 608. As shown at 610, the user profiles are then compared to the filtered target profiles to determine if there is a match. If there is a match, the settings 614 are checked to determine appropriate notices, alerts and other actions to take. The appropriate notices, alerts and actions are then taken by the mobile device 100 and server 302 as shown at 616. As described above, these actions may include notifying the user of a match, notifying the target of a match and/or notifying an intermediary that two second degree contacts have been matched.

As described above, programmable filters 518 may specify whether individual criteria/entries must be satisfied or whether only a percentage of the criteria/entries must be satisfied for an overall match between the criteria and a user's profile. In an example embodiment, regular expressions or other logic may be used as part of the programmable filters and/or criteria. A score may be calculated to determine whether a threshold is met for an overall match and for determining whether to notify the user of the other users and user profiles that meet the threshold. There may be more than one threshold or a scale that is used to determine how to notify the user. If another user with a very high score is nearby, the mobile device may be caused to emit an audible alert or vibrate as well as provide an SMS text message with information from the other user's profile. If the other user has a lower score that is still high enough for some threshold, a text message might be sent without an audible alert. These are examples only and other combinations of notifications and thresholds may be used.

In example embodiments, some criteria may be necessary for a match, such as whether the target is a male or female. Other criteria may contribute to a matching score that exceeds some threshold, such as income level. These criteria may contribute either zero or a fixed number (for example, based on the Weight 514) toward the score in some cases. For example, a single Weight 514 could be added to the score if the target shares a common second level contact, such as a user or other person listed in contact lists associated with the profiles for both the user and the target. In some cases, the criteria may allow the Weight 514, or a portion of the Weight 514, to be added to the score a number of times based on the other user's profile. For example, additional points could be added to the score for each second level contact in common between the user and the target. The programmable filter 518 may specify a rule whereby the points decrease (eventually is to zero) for each additional second level contact that is in common. The same approach may be used for other criteria, such as adding more points for higher income levels up to some maximum. Another example uses third order contacts (the user and the target each know someone who in turn knows a common person, which can be determined based on contact lists, or other factors as described above). Third order contacts may contribute some points to the score, but they may contribute fewer points (and have a lower weight) than second order contacts. Any of the other types of criteria and characteristics described above may also be factored into the score based on whether a logical criteria or rule is met and based on weights (whether fixed or scaled) that can be added to the score when the criteria or rule is met. A user interface with a dial, sliding bar or other adjustable setting may be used to adjust the weights for different criteria, which may include a setting making the criteria essential for matching, a setting (or scale of settings) for assigning weights/points that are contributed to the score, a setting indicating that a criteria will not used for matching and/or a setting indicating that a criteria disqualifies a target from matching. The threshold used for matching may also be adjusted by using a dial, sliding bar or other adjustable setting. If a user is getting too many matches or notices in a crowded location, the user can easily toggle the dial, sliding bar or other setting to raise the threshold score required for matching. If a user is in a location where matching is less likely (for example, traveling out of town or in a foreign country), the user can easily lower the threshold score required for matching. As described above, the threshold may also be automatically adjusted based on context, time of day, location or other factors determined by the system.

Similarly, scores and threshold may be used for entities, such as businesses, or venues or other objects to determine matching and whether to notify a user. In example embodiments, similar scores and thresholds may be combined with location based information to determine whether to send a promotional item, advertisement or coupon to a user. For example, a user may have a credit score or score based on purchases made or other criteria that meets a threshold. When a user with a score above the threshold is determined to be at a location near a store or business, a particular ad or electronic coupon may be sent to the user's mobile device. Scalable thresholds may also be used, where different ads or coupons are sent to users based on how much they exceed the threshold score. In some examples, directions to the location of a business or ads or coupons for a business may be sent to a user's mobile device, when the mobile device is determined to be near (or at) a competitor's business. Whether a user is near a location may be based on a pre-set radius or distance or may be weighted by different amounts as part of the score, depending upon how close the user is to the location.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising:
identifying, by a server over a network, a user profile associated with a social network comprising user profile information for a first user of a first device, the first user registered within the social network, said user profile information comprising data indicating a type of network and real-world activity performed by the first user, a time of each type of activity, a location associated with each activity and a frequency of each type of activity, the location being associated with a plurality of types of activities;

receiving, by the server, privacy settings and one or more programmable filters, the privacy settings comprising instructions controlling how the server hosts and makes accessible over the network said user profile information based on the context data, the one or more programmable filters comprising conditions indicating how the server matches the first user with available digital content based at least in part on said user profile information, and the one or more programmable filters being configured by the first user in the user profile information;

modifying, via the server, infrastructure of the social network related to the user profile based on said privacy settings and the context data by altering said infrastructure related to the user profile so that said user profile information is only accessible when a request complies with said privacy settings and said context data;

analyzing, via the server in accordance with the context data and said applied privacy settings to the infrastructure related to the user profile, the user profile information, and based on said analysis, determining behavior information of the first user, said determination comprising determining a pattern of activity performed by said first user from said user profile information, said pattern of activity comprising spatial data associated with the first user that indicates i) when each type of activity is performed by the first user, ii) where a location at which each type of activity is performed by the first user and iii) how often each type of activity is performed per location by the first user;

receiving, via the server, a request from a third party to provide digital content to said first user, said request corresponding to a specific time and specific location;

analyzing, via the server, the determined pattern of activity of the first user said analysis being based on said request, the context data, the one or more programmable filters and said applied privacy settings to the infrastructure related to the user profile;

identifying, based on the analysis of the pattern of activity of the first user, an activity identified by said pattern that corresponds to said specific time and said specific location;

determining, via the server, where and when said identified activity is next to occur based on said pattern of activity of the first user; and communicating, over the network to the first device, a message to the first device at a time and location proximate to when and where said identified activity is next to occur, the message comprising said digital content provided by the third party.

2. The method of claim 1, further comprising:
updating said pattern based on additionally identified activity by said first user;
dynamically modifying the message based on said updating; and
communicating said dynamically updated message.

3. The method of claim 1, wherein the behavioral information comprises web searching behavior of the first user.

4. The method of claim 1, wherein the behavioral information comprises purchasing behavior of the first user.

5. The method of claim 1, wherein the behavioral information comprises social networking activity of the first user.

6. The method of claim 1, wherein said determination is in accordance with the first device's current location.

7. The method of claim 6, wherein the current location of the first device is based on the first device transmitting location updates to the server upon a change in location.

8. The method of claim 6, wherein the current location of the first device is determined based on tracking of the first device.

9. The method of claim 1, wherein the location data comprises information related to past locations of the first device.

10. The method of claim 1, the one or more programmable filters being programmed based on one or more of: location information, time information, context information, and association information.

11. The method of claim 1, further comprising:
receiving, by the server, one or both of: availability settings, and aggregation settings, the availability settings and the aggregation settings comprising instructions controlling how the server uses the user profile information based on the context data.

12. A server comprising: a processor;
a non-transitory computer-readable storage medium for tangibly storing thereon program logic for execution by the processor, the program logic comprising:

logic executed by the processor for identifying, by the server over a network, a user profile associated with a social network comprising user profile information for a first user of a first device, the first user registered within the social network, said user profile information comprising context data indicating a type of network and real-world activity performed by the first user, a time of each type of activity and a frequency of each type of activity, a location associated with each activity and a frequency of each type of activity, the location being associated with a plurality of types of activities;

logic executed by the processor for receiving, by the server, privacy settings and one or more programmable filters, the privacy settings comprising instructions controlling how the server hosts and makes accessible over the network said user profile information based on the context data, the one or more programmable filters comprising conditions indicating how the server matches the first user with available digital content based at least in part on said user profile information, and the one or more programmable filters being configured by the first user in the user profile information;

logic executed by the processor for modifying, via the server, infrastructure of the social network relating to the user profile based on said privacy settings and the context data by altering said infrastructure related to the user profile so that said user profile information is only accessible when a request complies with said privacy settings and said context data;

logic executed by the processor for analyzing, via the server in accordance with the context data and said applied privacy settings to the infrastructure related to the user profile, the user profile information, and based on said analysis, determining behavior information of the first user, said determination comprising determining a pattern of activity performed by said first user from said user profile information, said pattern of activity comprising spatial data associated with the first user that indicates i) when each type of activity is performed by the first user, ii) where a location at which each type of activity is performed by the first user and iii) how often each type of activity is performed per location by the first user;

logic executed by the processor for receiving, via the server, a request from a third party to provide digital content to said first user, said request corresponding to a specific time and specific location;

logic executed by the processor for analyzing, via the server, the determined pattern of activity of the first user said analysis being based on said request, the context data, the one or more programmable filters and said applied privacy settings to the infrastructure relating to the user profile;

logic executed by the processor for identifying, based on the analysis of the pattern of activity of the first user, an activity identified by said pattern that corresponds to said specific time and said specific location;

logic executed by the processor for determining, via the server, where and when said identified activity is next to occur based on said pattern of activity of the first user; and logic executed by the processor for communicating, over the network to the first device, a message to the first device at a time and location proximate to when and where said identified activity is next to occur, the message comprising said digital content provided by the third party.

13. The server of claim 12, further comprising:

logic executed by the processor for updating said pattern based on additionally identified activity by said first user;

logic executed by the processor for dynamically modifying the message based on said updating; and logic executed by the processor for communicating said dynamically updated message.

14. The server of claim 12, wherein the one or more programmable filters being programmed based on one or more of: location information, time information, context information, and association information.

15. The server of claim 12, further comprising:

logic executed by the processor for receiving one or both of: availability settings, and aggregation settings, the availability settings and the aggregation settings comprising instructions controlling how the server uses the user profile information based on the context data.

* * * * *